(12) United States Patent
Nishide et al.

(10) Patent No.: US 7,649,075 B2
(45) Date of Patent: Jan. 19, 2010

(54) PROCESS FOR PREPARING POLYPHENYLENE ETHER

(75) Inventors: Hiroyuki Nishide, Tokyo (JP); Kei Saito, Tokyo (JP)

(73) Assignee: Waseda University, Tokyo (JP)

( * ) Notice: Subject to any disclaimer, the term of this patent is extended or adjusted under 35 U.S.C. 154(b) by 0 days.

(21) Appl. No.: 11/575,083

(22) PCT Filed: Sep. 7, 2005

(86) PCT No.: PCT/JP2005/016404

§ 371 (c)(1), (2), (4) Date: Oct. 16, 2007

(87) PCT Pub. No.: WO2006/030670

PCT Pub. Date: Mar. 23, 2006

(65) Prior Publication Data

US 2008/0071059 A1    Mar. 20, 2008

(30) Foreign Application Priority Data

Sep. 13, 2004  (JP) .............................. 2004-266044

(51) Int. Cl.
*C08G 65/38* (2006.01)
*C08G 2/00* (2006.01)

(52) U.S. Cl. ........................ 528/217; 528/212; 528/214

(58) Field of Classification Search ................ 528/217, 528/212, 214
See application file for complete search history.

(56) References Cited

U.S. PATENT DOCUMENTS

| 4,429,106 A | 1/1984 | Burzin et al. |
| 6,455,663 B1 * | 9/2002 | Braat et al. .................. 528/217 |

FOREIGN PATENT DOCUMENTS

| JP | 45-33430 | 10/1970 |
| JP | 53-018691 | 2/1978 |
| JP | 59-22920 A | 2/1984 |
| JP | 05-078471 A | 3/1993 |
| JP | 05-148356 A | 6/1993 |
| JP | 09-118746 A | 5/1997 |
| JP | 2000-281798 A | 10/2000 |
| JP | 2004-026959 A | 1/2004 |

OTHER PUBLICATIONS

K. Saito, et al., Oxidative Polymerization of 2,6-Dimethyl-phenol to Form Poly(2,6-dimethyl-1,4-phenyleneoxide) in Water, Angewandte Chemie International Edition, vol. 43, pp. 730-733, 2004.

* cited by examiner

*Primary Examiner*—Terressa M Boykin
(74) *Attorney, Agent, or Firm*—Darby & Darby PC

(57) ABSTRACT

A process for preparing polyphenylene ether by oxidizing phenols using water as a solvent, enabling polyphenylene ether to be prepared with only a small amount of oxidizer, while making it possible to reuse a solvent after reaction repeatedly. Water is used as the solvent. Phenols are oxidized under the presence of a water-soluble metal complex catalyst. For the water-soluble metal complex catalyst, it is preferable to use the one whose central metal is copper or manganese, having an amine multidentate ligand.

1 Claim, No Drawings

PROCESS FOR PREPARING POLYPHENYLENE ETHER

CROSS REFERENCE TO PRIOR APPLICATIONS

This is a U.S. national phase application under 35 U.S.C. §371 of International Patent Application No. PCT/JP2005/016404, filed Sep. 7, 2005, which claims the benefit of Japanese Application No. 2004-266044, filed Sep. 13, 2004, both of which are incorporated by reference herein. The International Application was published in Japanese on Mar. 23, 2006 as International Publication No. WO 2006/030670 A1 under PCT Article 21(2).

FIELD OF THE INVENTION

This invention relates to a process for preparing polyphenylene ether.

BACKGROUND ART

Polyphenylene ether that is represented by poly (2,6-dimethyl-1,4-phenylene ether) is excellent in heat resistance, self-extinguishing property, chemical resistance, dimensional stability, electric properties, workability, etc. and it is one of the five well-known engineering plastics.

Conventionally, polyphenylene ether, specifically poly (2,6-dimethyl-1, 4-phenylene ether) has been prepared by oxidation polymerization of 2,6-dimethyl phenol in an organic solvent such as toluene and benzene, using tertiary amine (e.g. pyridine etc.) and metal salt (e.g. cuprous chloride etc.) that can form a complex jointly with tertiary amine, as a catalyst at room temperature in oxygen atmosphere. In this oxidation polymerization, however, oxygen is used as an oxidizer, and toluene or the like as a solvent, and thus there is an extremely high risk of explosion hazard so that a large-scale explosion-proof reaction tank is needed. Further, since an organic solution such as toluene or the like is used, organic solvent recovery process also is needed.

In order to solve these problems, inventors of the present invention once disclosed an example of the process for preparing polyphenylene ether, by oxidation polymerization, using water as a solvent, in which potassium hexacyanoferrate (III) or a water-insoluble copper complex is used as an oxidizer (see Patent Document 1). According to this prior art, water with less environmental burdens is used as a solvent to prepare polyphenylene ether, thus enabling the conventional reactor tank to be replaced by one having a substantially simplified explosion-proof and solvent-resistant structure. Further, solvent recovery process can be cut out because target polyphenylene ether is able to be separated by the simple filtering of polymer precipitated in a water phase.

In the meantime, this reaction is heterogeneous polymerization in which 2,6 dimethyl phenol as a monomer remaining dissolved in water is allowed to precipitate as it is converted into a dimer or higher one in the reaction process, and when oxidizer is added to the solvent, polyphenylene ether is immediately allowed to precipitate as a white solid from a water phase. The inventors of the present invention concluded that the foregoing reaction has a peculiar polymerization mechanism in which a radical produced on a water interface grows in a coupling manner in the solid phase (see Non-Patent Document 1)

Patent Document 1: Japanese Unexamined Patent Publication. No. 2004-26959
Patent Document 2: Japanese Unexamined Patent Publication No. 2000-281798
Patent Document 3: Japanese Unexamined Patent Publication No. H5-78471
Patent Document 4: Japanese Unexamined Patent Publication No. H9-118746
Non-Patent Document 1: Angew. Chem. Int. Ed. by K. Saito, T. Tago, T. Matsuyama, H. Nishide, vol. 43, p 730, 2004

DISCLOSURE OF THE INVENTION

Problems to be Solved by the Invention

In the above-mentioned oxidation polymerization using water as a solvent, however, there have been problems that a large amount of oxidizer is required for the process, and the water as a solvent after the reaction cannot be reused, so that post treatment of the solvent is needed.

In view of the above problems with the conventional art, it is an object of the present invention to provide a process for preparing polyphenylene ether by oxidizing phenols using water as a solvent with a small amount of oxidizer, while making it possible to repeatedly reuse the solvent after reaction.

Means of Solving the Problems

As the result of dedicated studies to solve the above-mentioned problems, the inventors of the present invention have found it out that a water-soluble and base-resistant (alkali-resistant) metal complex having an amine-based multidentate ligand is effective in the process for preparing polyphenylene ether using water as a solvent. The present invention has been completed based on this finding.

The process for preparing polyphenylene ether according to a first aspect of the present invention is characterized in that phenols are oxidized using water as a solvent in the presence of a water-soluble metal complex catalyst.

The process for preparing polyphenylene ether according to a second aspect of the present invention is characterized in that the water-soluble metal complex catalyst according to the first aspect has an amine multidentate ligand.

The process for preparing polyphenylene ether according to a third aspect of the present invention is characterized in that the solvent according to the first aspect contains a 0 to 10,000-fold molar excess of the base based on the phenols.

The process for preparing polyphenylene ether according to a fourth aspect of the present invention is characterized in that a central metal of the water-soluble metal complex catalyst according to the second aspect is copper or manganese.

The process for preparing polyphenylene ether according to a fifth aspect of the present invention is characterized in that the water-soluble metal complex catalyst according to the fourth aspect has an amine-based multidentate ligand, wherein the amine-based multidentate ligand is substituted in at least one substitution site by at least one selected from a group consisting of hydroxy group, carboxylic group, phosphonate group, sulfonate group, pyridinyl group, hydroxymethyl group, propionic group, methylenephosphonate group, methylenesulfonic acid group, pyridinyl methyl group, hydroxyalkyl group, alkylenecarboxylic acid, alkylenephosphonic acid, alkylenesulfonic acid, pyridinylalkyl group, hydroxyaryl group, arylenecarboxylic acid, arylenephosphonic acid, arylenesulfonic acid and pyridinylaryl group.

Effects of the Invention

According to the process for preparing polyphenylene ether of the present invention, polyphenylene ether is able to be prepared with an extremely small amount of an oxidizer by oxidizing phenols through a catalytic reaction where a water-soluble metal complex catalyst is used as an oxidizer while using water as a solvent. Further, according to the process for preparing polyphenylene ether of the present invention, reaction proceeds under such an extremely mild condition as at around ordinary temperature and ordinary pressure, using water with less environmental burdens as solvent, while making it possible to reuse the solvent after reaction repeatedly. Further, because the water-soluble metal complex catalyst is dissolved in water and thus it is hardly incorporated into the polyphenylene ether thus produced, high-purity polyphenylene ether can be easily obtained without refining.

BEST MODE FOR CARRYING OUT THE INVENTION

Next is a detailed description of the process for preparing polyphenylene ether of the present invention.

The process for preparing polyphenylene ether of the present invention is the one where phenols are oxidized using water as a solvent in the presence of a water-soluble metal complex catalyst.

Phenols as mentioned in the present invention are represented by general chemical formula 1, while polyphenylene ether obtained by the process for preparing polyphenylene ether of the present invention is represented by general chemical formula 2, in which O denotes oxygen atom, $R^1$-$R^4$ denote hydrogen atom, methyl group, other alkyl group, substituted alkyl group, phenyl group, substituted aryl group, methoxy group, sulfonic acid group, carboxylic acid group, fluoro group, bromo group, chloro group, iodine group, nitro group, cyano group respectively, which may be either common or not common to each other.

Chemical formula 1

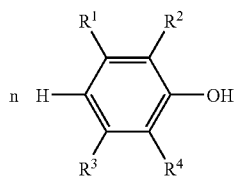

Chemical formula 2

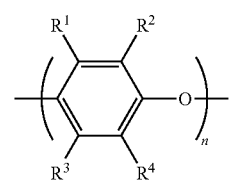

A catalyst having an amine-based multidentate ligand may preferably be used as the water-soluble metal complex catalyst of the present invention, because the resultant complex thus obtained is in a stable coordination state, and it is not easily deactivated by hydrolysis or the like.

Further, as this water-soluble metal complex catalyst having an amine-based multidentate ligand may preferably be used highly hydrosoluble one, that is, preferably the one having the amine-based multidentate ligand that is substituted in at least one substitution site by at least one selected from the group of hydroxy group, carboxylic group, phosphonate group, sulfonate group, pyridinyl group, hydroxymethyl group, propionic group, methylenephosphonate group, methylenesulfonic acid group, pyridinyl methyl group, hydroxyalkyl group, alkylenecarboxylic acid, alkylenephosphonic acid, alkylenesulfonic acid, pyridinylalkyl group, hydroxyaryl group, arylenecarboxylic acid, arylenephosphonic acid, arylenesulfonic acid and pyridinylaryl group.

Examples of water-soluble metal complex catalysts used in the present invention include catalysts having alkylene amine-based multidentate ligands expressed by the following general chemical formulae 3, 4, 5, 6 and 7, as represented by ethylenediamine-N,N,N',N'-tetraacetic acid or trans-1,2-diaminocyclohexanete-,N, N,N',N'-tetraacetic acid.

Chemical formula 3

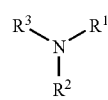

Chemical formula 4

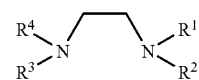

Chemical formula 5

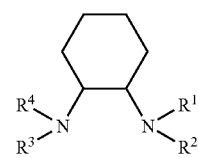

Chemical formula 6

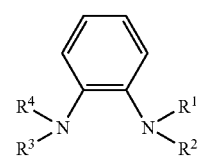

Chemical formula 7

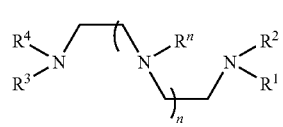

Alternatively, as water-soluble metal complex catalysts of the present invention may be used catalysts having aliphatic cyclic amine-based multidentate ligands expressed by general chemical formula 8 as represented by 1, 4, 7, 10-tetraaza-cycldodecane, or ones having aromatic amine multidentate ligands expressed by general chemical formulae 9, 10, 11 and 12, as represented by porphyrin, phthalocyanine and phenanthrene.

Chemical formula 8

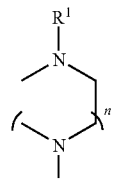

Chemical formula 9

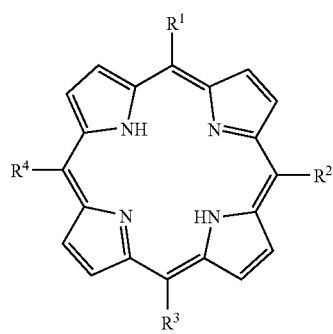

-continued

Chemical formula 10

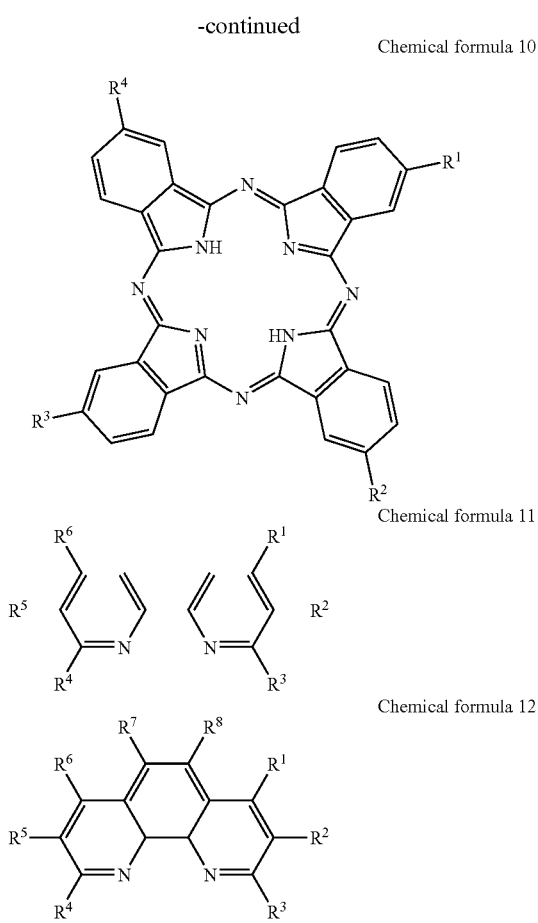

Chemical formula 11

Chemical formula 12

Throughout the foregoing chemical formulae 3-12, N denotes nitrogen atom, and R" (n=1,2,3 . . .) denote a hydrogen atom, or a hydroxy group, a carboxylic acid group, a phosphonate group, a sulfonate group, a pyridinyl group, a hydroxymethyl group, a propionic group, a methylenephosphonate group, a methylenesulfonic acid group, a pyridinyl methyl group, a hydroxyalkyl group, an alkylenecarboxylic acid, an alkylenephosphonic acid, an alkylenesulfonic acid, a pyridinylalkyl group a hydroxyaryl group, an arylenecarboxylic acid, an arylenephosphonic acid, an arylenesulfonic acid and a pyridinylaryl group, respectively, which may be either common or not common to each other.

As water-soluble metal complex catalysts of the present invention may be used ones in which a central metal is a transition metal such as copper, manganese, iron, cobalt, nickel, zinc or the like. In these transition metals, copper or manganese is preferably used as the central metal for the following reasons: 1) the reduction potential of the resultant complex is appropriately higher than the oxidation potential of phenols, 2) the resultant catalyst is easily re-oxidized and thus capable of being used repeatedly; 3) the coordination state of the resultant complex is stable and not easily deactivated by hydrolysis, etc.

It should be noted that conventional metal-amine complexes that have been used as catalysts for polyphenylene ether are hydrolyzed and deactivated after producing metal hydroxides when used in a basic aqueous solution. For that reason, conventional metal-amine complexes are not able to be used in a water solution repeatedly. According to the water-soluble metal complex having the amine-based multidentate ligand of the present invention, however, it is less likely to be hydrolyzed, because the central metal thereof is protected by the chelate action, so it is able to be used repeatedly, providing high-molecular-weight polyphenylene ether. The polymerization mechanism is such that after phenol is coordinated with the complex, phenoxy radical is produced because electron is pulled out to the central metal, so that the coupling of the phenoxy radicals progresses in a solid phase, thereby providing polyphenylene ether. Further, the water-soluble metal complex of the present invention is oxidized and reactivated even by low concentration of oxygen in the solvent. Therefore, the water-soluble metal complex acts as catalyst, and the reaction proceeds even with a small amount of the catalyst relative to phenols.

Whilst water is used as a solvent in the present invention, the solvent contains a 0 to 10,000-fold molar excess of base with respect to the phenols used as raw materials. Examples of such bases include alkalies as represented by sodium hydroxide, potassium hydroxide, magnesium hydroxide, calcium hydroxide, etc., or amines as represented by ammonia, trimethylamine or the like. Alternatively, it is possible to use, as the base, the ones whose pH is kept high in a water phase such as ion-exchange resins having basic radicals. Alkalies as mentioned above mean metal hydroxides. In the meantime, as for the bases used in the present invention, it is preferable to use sodium hydroxide or potassium hydroxide as alkalies, more preferably, sodium hydroxide in terms of the cost and handling properties.

Next is a description of the process for preparing polyphenylene ether of the present invention, using the above-mentioned phenols, water-soluble metal complex catalyst and bases.

At first, the base is dissolved in water as needed. Preferably, 0 to 10,000-fold, more preferably, 1 to 500-fold molar excess of the base with respect to the phenols is dissolved in water. When the amount of the base is less than one fold in molar, polyphenylene ether yield decreases abruptly, while when it is more than 500-fold in molar, the neutralization treatment to water after the reaction becomes difficult although polyphenylene ether yield is increased slightly.

Next, a solution of the water-soluble metal complex catalyst is prepared by adding the amine-based multidentate ligand and the metal base to the water. Then, another solution of phenols is prepared by adding phenols to water, and dissolving the same therein, using emulsifier as needed. The emulsifier makes it easier to dissolve hydrophobic polyphenylene ether in water, making contribution to the production of high molecular weight polyphenylene ether.

Examples of the emulsifiers that can be used in the present invention include n-sodium dodecyl sulfate, n-tridecyl sodium sulfate, sodium dodecanoate, sodium dodecyl sulfate, sodium dodecylbenzenesulfonate or the like, which are anion-based detergents.

Then, the solution of the water-soluble metal complex catalyst prepared previously and the solution of the phenols are mixed, and stirred while ventilating, to thereby react the former with the latter.

It is desirable that this reaction be allowed to progress at around ordinary temperature and ordinary pressure in either ambient or oxygen atmosphere. If the temperature is in a range of from 0 to 100 deg C., the reaction progresses as it does at ordinary temperature. The amount of the water-soluble metal complex catalyst may be either equal to the amount of phenols as substrate, or to catalytic amount. In the case that it is equal to catalytic amount, oxygen or the like can act as oxidizer.

Because water is used as a solvent in the present invention, the resultant polyphenylene is allowed to precipitate as a white suspended matter. Therefore, as a post-reaction processing method, filtering or simple centrifugal separation may be used to separate polyphenylene ether therefrom. In the case that the emulsifier is used as well, target polyphenylene oxide is precipitated by adding salt such as sodium chloride etc., and thus, it may be separated similarly by filtering or simple centrifugation only. By carrying out rinsing and drying processes after the separation, white powdered polyphenylene ether can be obtained.

Whilst the present invention is featured by using the water as a solvent, the reaction proceeds in the same way even if the water is replaced by methanol or ethanol displaying similar properties. Further, the reaction proceeds in the same way again, using combined solvent comprised of a mixture of the water and at least one of methanol, ethanol, benzene, toluene, o-xylene, acetone, acetonitrile, 1,4-dioxane and the like.

As described above, the process for preparing polyphenylene ether of the present invention is the one oxidizing phenols using water as a solvent under the presence of the water-soluble metal complex catalyst. According to the process for the preparing polyphenylene of the present invention, polyphenylene ether can be produced with an extremely small amount of oxidizer, using water as a solvent, and the water-soluble metal complex catalyst as an oxidizer. Further, according to the process of the present invention, reaction is allowed to proceed under the extremely mild condition such as at ordinary temperature and ordinary pressure, using water with less environmental burdens as a solvent, and the solvent after reaction can be used repeatedly. Moreover, because the water-soluble metal complex catalyst is dissolved in water, and is not easily incorporated into the obtained polyphenylene ether, high-purity polyphenylene ether can be obtained easily without any particular refining process.

In addition, polyphenylene ether can be prepared with a simplified reactor tank without using a large-scale explosion-proof/solvent-resistant tank, and the preparation efficiency is high because targeted polyphenylene ether is able to be separated easily by subjecting the obtained polymer precipitated in a water phase after reaction to centrifugal separation or the like.

Specifically, by using the water-soluble metal complex catalyst having amine-based multidentate ligand whose central metal is copper or manganese, the coordination state of the water-soluble metal complex catalyst remains stable, and it is less likely to be deactivated by hydrolysis. Further, because the water-soluble metal complex catalyst is oxidized and reactivated by low-concentration oxygen in the solvent, the solvent after reaction can be used repeatedly. Furthermore, the water-soluble metal complex acts as catalyst, and the reaction proceeds with a small amount of the catalyst relative to the phenols, therefore, the process is advantageous from an economical viewpoint.

Moreover, by using the highly water-soluble metal complex catalyst having amine-based multidentate ligand which is substituted in its at least one substitution site by at least one selected from a group consisting of hydroxy group, carboxylic acid group, phosphonate group, sulfonate group, pyridinyl group, hydroxymethyl group, propionic group, methylenephosphonate group, methylenesulfonic acid group, pyridinyl methyl group, hydroxyalkyl group, alkylenecarboxylic acid, alkylenephosphonic acid, alkylenesulfonic acid pyridinylalkyl group, hydroxyaryl group, arylenecarboxylic acid, arylenephosphonic acid, arylenesulfonic acid and pyridinylaryl group, the resultant water-soluble metal complex catalyst is less likely to be incorporated into the produced polyphenylene ether, and thus high-purity polyphenylene ether can be obtained easily without any particular refining process.

Also, according to the present invention, whilst the solvent contains a 0 to 10,000-fold in molar excess of the base relative to the phenols, polyphenylene ether can be prepared with high yield by adding the bases to the solvent according to need.

Further detail of the present invention will be explained by way of specific examples below.

EXAMPLE 1

Sodium hydrate of 0.4 g (0.5M) was dissolved in water of 20 ml, and then a complex solution was prepared by adding trans-1,2-diaminocyclohexanete-N,N,N', N'-tetraacetic acid of 364 g (0.05M) and copper (II) chloride dihydrate of 0.17 g (0.05M) to the sodium hydrate solution of 10 ml. Then, to the remaining sodium hydrate solution were added 2,6-dimethyl phenol of 1.22 g (0.5M) and n-sodium dodecyl sulfate of 0.148 g (0.025M) as an emulsifier, and dissolved. Then, 10 ml of the complex solution prepared previously was mixed with it and the obtained mixture was stirred for 24 hours at 50 deg C. while ventilating. After the reaction, a white suspended matter was obtained by adding an appropriate quantity of sodium chloride. After filtering process, a 1.11 g white powder was obtained by rinsing and drying process under reduced pressure.

The production of poly (2,6-dimethyl-1,4-phenylene ether) was confirmed from ether bond at 1186 $cm^{-1}$ ($v_{c-o-c}$) in IR spectra; 2.09 ppm (s, 6H), 6.47 ppm (s, 2H), in $^1$H-NMR spectra; and 114.5, 132.5, 145.4, 154.7 ppm in $^{13}$C-NMR spectra. Yield: 93%, Number average molecular weight: $3.0 \times 10^4$, Weight-average molecular weight: $5.3 \times 10^5$, and 10% thermal decomposition temperature: 420 deg C.

EXAMPLE 2

Poly (2,6-dimethyl-1,4-phenylene ether) was obtained through the same reaction as Example 1, except that the metal was replaced by manganese chloride.(II) tetrahydrate of 0.197 g (0.05M).

The production of poly (2,6-dimethyl-1,4-phenylene ether) was confirmed from ether bond at 1186 $cm^{-1}$ ($v_{c-o-c}$) in IR spectra; 2.09 ppm (s, 6H), 6.47 ppm (s, 2H), in $^1$H-NMR spectra; and 114.5, 132.5, 145.4, 154.7 ppm in $^{13}$C-NMR spectra. Yield: 92%, number average molecular weight: $2.5 \times 10^4$, weight average molecular weight: $4.3 \times 10^4$, and 10% thermal decomposition temperature: 420 deg C.

EXAMPLE 3

Poly (2,6-dimethyl-1,4-phenylene ether) was obtained by the same reaction as Example 1, except that n-sodium dodecyl sulfate as emulsifier was not added.

The production of poly (2,6-dimethyl-1,4-phenylene ether) was confirmed from ether bond at 1186 $cm^{-1}$ ($v_{c-o-c}$) in IR spectra; 2.09 ppm (s, 6H), 6.47 ppm (s, 2H) in $^1$H-NMR spectra; and 114.5, 132.5, 145.4, 154.7 ppm in $^{13}$C-NMR spectra. Yield: 92%, number average molecular weight: $1.0 \times 10^4$, weight average molecular weight: $1.3 \times 10^4$, and 10% thermal decomposition temperature: 400 deg C.

EXAMPLE 4

Poly (2,6-dimethyl-1,4-phenylene ether) was obtained by the same reaction as Example 1, except that the amount of sodium hydrate was changed to 0.8 g (1.0 M)

The production thereof was confirmed from ether bond at 1186 cm$^{-1}$ ($v_{c-o-c}$) in IR spectra; 2.09 ppm (s, 6H), 6.47 ppm (s, 2H) in $^1$H-NMR spectra; and 114.5, 132.5, 145.4, 154.7 ppm in $^{13}$C-NMR spectra. Yield: 83%, number average molecular weight: $3.2\times10^4$, weight average molecular weight: $6.2\times10^4$, and 10% thermal decomposition temperature: 423 deg C.

EXAMPLE 5

Poly (2,6-dimethyl-1,4-phenylene ether) was obtained by the same reaction as Example 1, except that the ligand was changed to N-(2-hydoxyethyl) ethylenediamine-N,N',N'-triacetic acid of 0.278 g (0.05M).

The production thereof was confirmed from ether bond at 1186 cm$^{-1}$ ($v_{c-o-c}$) in IR spectra; 2.09 ppm (s, 6H), 6.47 ppm (s, 2H) in $^1$H-NMR spectra; and 114.5, 132.5, 145.4, 154.7 ppm in $^{13}$C-NMR spectra. Yield: 70%, number average molecular weight: $1.8\times10^3$, weight average molecular weight: $2.4\times10^4$, and 10% thermal decomposition temperature: 406 deg C.

EXAMPLE 6

Poly (2,6-dimethyl-1,4-phenylene ether) was obtained by the same reaction as Example 1, except that the ligand was changed to triethylenetetraamine-N,N,N', N'', N''',N'''-hexa acetic acid of 0.494 g (0.05M).

The production thereof was confirmed from ether bond at 1186 cm$^{-1}$ ($v_{c-o-c}$) in IR spectra; 2.09 ppm (s, 6H), 6.47 ppm (s, 2H) in $^1$H-NMR spectra; and 114.5, 132.5, 145.4, 154.7 ppm in $^{13}$C-NMR spectra. Yield: 67%, number average molecular weight: $3.5\times10^4$, weight average molecular weight: $7.1\times10^4$, and 10% thermal decomposition temperature: 425 deg C.

EXAMPLE 7

Poly (2,6-dimethyl-1,4-phenylene ether) was obtained by the same reaction as Example 1, except that the ligand was changed to 5, 10, 15, 20-tetraphenyl 21H, 23H-porphyrintetarasulfonate of 1.203 g (0.05M).

The production thereof was confirmed from ether bond at 1186 cm$^{-1}$ ($v_{c-o-c}$) in IR spectra; 2.09 ppm (s, 6H), 6.47 ppm (s, 2H) in $^1$H-NMR spectra; and 114.5, 132.5, 145.4, 154.7 ppm in $^{13}$C-NMR spectra. Yield: 65%, number average molecular weight: $6.0\times10^3$, weight average molecular weight: $1.1\times10^4$, and 10% thermal decomposition temperature: 390 deg C.

The invention claimed is:

1. A process for preparing polyphenylene ether, wherein 2,6-dimethyl phenol is oxidized to prepare poly (2,6-dimethyl-1,4-phenylene ether) using water as a solvent, under the presence of water-soluble metal complex catalyst,
    wherein a central metal of said water soluble metal complex catalyst is copper or manganese and ligands of said catalyst are trans-1,2-diaminocyclohexanete-N,N,N', N'-tetraacetic acid,
    wherein said solvent contains 0 to 10,000-fold molar excess of a base based on said 2,6-dimethyl phenol.

* * * * *